United States Patent
Pomietlasz

(10) Patent No.: US 8,922,421 B2
(45) Date of Patent: Dec. 30, 2014

(54) METHOD AND SYSTEM FOR USE OF GPS DISCIPLINED OSCILLATORS FOR COHERENT TIMING REFERENCE IN DISTRIBUTED RADAR SYSTEMS

(75) Inventor: Daniel J. Pomietlasz, Syracuse, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 402 days.

(21) Appl. No.: 12/965,458

(22) Filed: Dec. 10, 2010

(65) Prior Publication Data

US 2012/0188125 A1 Jul. 26, 2012

Related U.S. Application Data

(60) Provisional application No. 61/285,458, filed on Dec. 10, 2009.

(51) Int. Cl.
*H01Q 3/00* (2006.01)
*G01S 13/87* (2006.01)
*G01S 19/14* (2010.01)

(52) U.S. Cl.
CPC . *G01S 13/87* (2013.01); *G01S 19/14* (2013.01)
USPC .............................. 342/59; 342/89; 342/368

(58) Field of Classification Search
CPC ....... G01S 13/003; G01S 13/87; G01S 19/11; G01S 19/235
USPC .......................................................... 342/89
See application file for complete search history.

(56) References Cited

U.S. PATENT DOCUMENTS

| | | | | |
|---|---|---|---|---|
| 5,363,109 | A * | 11/1994 | Hofgen et al. | 342/31 |
| 5,886,662 | A * | 3/1999 | Johnson | 342/25 A |
| 5,896,105 | A * | 4/1999 | Murphy et al. | 342/368 |
| 6,091,362 | A * | 7/2000 | Stilp et al. | 342/465 |
| 6,377,204 | B1 * | 4/2002 | Wurman et al. | 342/59 |
| 6,590,524 | B1 * | 7/2003 | Farley et al. | 342/357.48 |
| 6,856,276 | B2 * | 2/2005 | Barrick et al. | 342/59 |
| 7,436,911 | B2 * | 10/2008 | Fudge et al. | 375/340 |

(Continued)

OTHER PUBLICATIONS

Wikipedia Article, "Global Positioning System", Dec. 9, 2008 version.*

(Continued)

*Primary Examiner* — John B Sotomayor
*Assistant Examiner* — Marcus Windrich
(74) *Attorney, Agent, or Firm* — Howard IP Law Group, PC

(57) ABSTRACT

An active electronically scanned array radar system and method uses a coherent, stable timing reference to transmit phase synchronized radar signals from a plurality of receiver/exciter elements. A global positioning system (GPS) carrier phase disciplined oscillator receives the GPS carrier signal at a GPS receiver. The GPS carrier contains phase and timing information to phase synchronize the local clock with the GPS carrier to produce a reference clock signal. The reference clock signal is used to synchronize a frequency synthesizer oscillator clock and generate a stable timing reference signal at a frequency significantly greater than the reference clock frequency. The stable timing reference is used to transmit radar signals in a receiver/exciter pair, the radar signals phase synchronized with the GPS carrier signal. Each receiver/exciter element generates its own stable timing reference based on a common GPS carrier. The radar signals from the plurality of receiver/exciter elements use a common clock without need of a physical distribution mechanism.

29 Claims, 9 Drawing Sheets

(56) References Cited

U.S. PATENT DOCUMENTS

| | | | | |
|---|---|---|---|---|
| 7,535,958 | B2* | 5/2009 | Best | 375/239 |
| 8,077,083 | B2* | 12/2011 | Blake | 342/357.34 |
| 8,116,350 | B1* | 2/2012 | Arndt et al. | 375/130 |
| 2002/0196186 | A1* | 12/2002 | Holt | 342/453 |
| 2003/0071751 | A1 | 4/2003 | Barrick et al. | 342/104 |
| 2004/0037282 | A1* | 2/2004 | Boland et al. | 370/392 |
| 2005/0199812 | A1* | 9/2005 | Shih | 250/338.1 |
| 2006/0022873 | A1* | 2/2006 | Zimmerman | 342/464 |
| 2006/0273972 | A1 | 12/2006 | Chandler | 343/754 |
| 2008/0036648 | A1* | 2/2008 | Green et al. | 342/174 |
| 2008/0158055 | A1* | 7/2008 | Paynter | 342/375 |
| 2008/0240073 | A1* | 10/2008 | Pun et al. | 370/350 |
| 2008/0303601 | A1* | 12/2008 | Young | 331/66 |
| 2011/0148492 | A1* | 6/2011 | Akita | 327/163 |
| 2012/0142280 | A1* | 6/2012 | Banu et al. | 455/69 |
| 2012/0249366 | A1* | 10/2012 | Pozgay et al. | 342/354 |

OTHER PUBLICATIONS

Gasparini et al. "A Digital Circuit for Jitter Reduction of GPS-disciplined 1-pps Synchronization Signals", Department of Information and Communication Technology, Univ of Trento Via Sommarive, 14-38100, Trento, Italy, AMUEM 2007—International Workshop on Advanced Methods for Uncertainty Estimation in Measurement Sardagna, Trento, Italy, 16-18, 5 pages, Jul. 2007.

Brown et al. "A GPS Receiver Designed for Carrier-phase Time Transfer", Proceedings of ION National Technical Meeting, Anaheim CA, 7 pages, Jan. 2000.

K. Larson & Judah Levine, "Time Transfer Using the Phase of the GPS Carrier". IEEE Transactions on Ultrasonics Ferroelectrics, and Frequency Control, vol. 45, No. 3, pp. 539-540, May 1998.

K. Larson & Judah Levine, "Carrier-Phase Time Transfer", IEEE Transaction on Ultrasonics, Ferroelectrics and Frequency Control, vol. 46, No. 4, pp. 1001-1012, Jul. 1999.

Dunn et al., "Subnanosecond GPS-Based Clock Synchronization and Precision Deep-Space Tracking", TDA Progress Report 42-111, pp. 1-10, Nov. 15, 1992.

Yang et al., "Assessment of Time Transfer Performance between TWSTFT and GPS Carrier Phase at KRISS", Frequency Control Symposium 2007, Joint with the 21st European Frequency and Time Forum, IEEE International, ISBN 9778-1-4244-0647-1, pp. 942-945, Jun. 1, 2007.

G. Stenberg et al., "A Picosecond Accuracy Timing System Based on L1-only GNSS Receivers for a Large Aperture Array Radar", ION GNSS 21st. International Technical Meeting of the Satellite Division, 16-19, Savannah, GA, pp. 576-580, Sep. 2008.

Wang et al. "GPS-Disciplined Waveform Synthesis for Distributed Radar Systems", Radar Conference, 2009 IET International, IEEE, ISBN 978-1-84919-010-7, 3 pages, Apr. 22, 2009.

\* cited by examiner

METHOD AND SYSTEM FOR USE OF GPS DISCIPLINED OSCILLATORS FOR COHERENT TIMING REFERENCE IN DISTRIBUTED RADAR SYSTEMS

CROSS REFERENCE TO RELATED APPLICATIONS

This application claims priority under 35 U.S.C. §119(e) to Provisional Patent Application Ser. No. 61/285,458 entitled "Method and System for use of GPS Disciplined Oscillators for Coherent Timing Reference in Distributed Radar Systems" filed Dec. 10, 2010, the subject matter thereof incorporated herein by reference in its entirety.

FIELD OF THE INVENTION

The present invention relates generally to radar systems, and more particularly to coherent timing references for use in distributed radar systems.

BACKGROUND

Active Electronically Scanned Array (AESA) radar systems utilizing distributed receiver/exciter elements are required to maintain synchronization (have synchronized frequency and phase) between each receiver/exciter. The signals generated at the exciters require coherence with respect to the other exciter signals to achieve proper phasing for each transmit signal. At the receiver, analog-to-digital (A/D) converter sample clocks also require coherence with respect to one another for proper reception and timing of the received signals for subsequent processing. AESA radar systems require phase lock (that is, substantially zero (0) phase drift) between receiver/exciter elements to achieve optimum performance. The effects of phase drift and/or clock jitter on radar performance results in limitations on achievable clutter cancellation performance, increased A/D noise, and other performance degradations. Minimum time requirements for AESA radar systems to maintain phase lock for coherent integration are highly application dependent and range from less than one millisecond (ms) for short range radars to many milliseconds for long range radars.

Current ultra-stable oscillators, such as rubidium oscillators or oven controlled crystal oscillators (OCXOs) for example, have a short term Allen Deviation of about (or slightly less than) $5.0 \times 10^{-12}$ over a one second period. However, these devices have a long term Allen Deviation of only about (or slightly less than) $1.0 \times 10^{-11}$ over a one hundred second period and about or slightly less than $4.0 \times 10^{-8}$ per year due at least in part to aging of the crystal. As a result, in order for current ultra-stable oscillators to be used to provide coherent timing for AESA radar receiver/exciter pairs, the oscillators require synchronization with a master timing reference.

To accomplish this, conventional AESA radar systems generate and distribute a coherent timing signal by generating a timing signal from a single master oscillator and distributing the signal to receiver/exciter pairs using a series of signal splitters and phase matched interconnects, for example, cables or backplane distribution traces. Cables or backplane distribution traces may accomplish phase matching using conventional methods, such as by having cables each of whose length is calibrated to maintain phase coherence at the receiving element (e.g. identical length cables between the master timing reference and each local oscillator) to avoid phase differences among the elements. The local oscillator driving each receiver/exciter pair is in a phase-locked loop (PLL) with the master timing reference. The master timing reference adjusts the local oscillator in real time to compensate for the phase drift that naturally occurs over time between each of the local oscillators. It is contemplated that AESA radars be configured with a receiver/exciter pair per element or sub-array. This would necessitate distribution of master timing reference signals to upwards of hundreds or thousands of distributed receivers and exciters based on present AESA applications. The complexity and weight of such a distributed network would increase significantly (relative to present systems), adversely impacting designs for these already weight challenged systems. Moreover, distribution of a master timing reference in an AESA radar system implementing elements separated over great distances (e.g. such as in over the horizon (OTH) radar systems where the maximum distance between elements can exceed 2 kilometers (km)), may not be possible utilizing conventional distribution approaches. While distributing a single coherent timing signal solves the phase drift problem between the exciter/receiver pairs in a single AESA radar system, it does not enable multiple radars to remain synchronous with one another due to the drift of the single timing source. Much like the requirement to provide a single timing source to correct for the phase drift associated with each exciter/receiver pair, a similar common timing source would be required to correct for the phase drift between multiple radar systems when configured to perform coherent aperture combining such as in MIMO systems.

One approach to providing clock synchronization amongst distributed devices (e.g. cell phones) without requiring a complex distribution network involves using a global position system (GPS) disciplined oscillator to coherently synchronize local clocks (i.e. local oscillators). This approach involves receiving a one pulse per second (1PPS) GPS signal (e.g. L1 signal) and comparing the arrival time of the signal with the time code referenced to the clock on the satellite to recover the time within 100 nanoseconds deviation. While accuracy within 100 nanoseconds is sufficient for many purposes, AESA radar systems require phase matching of less than one half (½) wavelength to allow the calibration process to compensate for the phase offset between the exciter/receiver pairs with negligible phase ambiguity. Radar systems require a coherent clock reference with sufficient accuracy (e.g. phase coherence within approximately 10 picoseconds (ps) or about 10 degrees of a 1.5 GHz GPS carrier signal) to allow the radar to operate properly. Therefore, the conventional GPS approach is insufficient to replace the master oscillator and complex distribution network used on AESA radars.

An alternative approach involves measuring the precise position of each receiver/exciter pair relative to a master timing reference. The precise position measurement is utilized to determine the distance between each receiver/exciter pair and the master timing reference. A phase compensation value is generated based on the determined differential distance, and the timing signal from the master timing reference delayed to each receiver/exciter pair according to the particular phase compensation value so that the signals arrive in phase lock to the entire array. This approach suggests utilizing GPS carrier waves to measure the position of each receiver/exciter pair and the master timing reference to a very high degree of accuracy, thereby allowing for reduced length cables and/or back traces at the expense of increased complexity of an AESA radar system. Furthermore, the multitude of cables and back traces required to implement large array systems nevertheless add significant weight and cost to already overburdened array structures.

Alternative systems and methods are desired.

SUMMARY

An active electronically scanned array radar system and method uses a coherent, stable timing reference to transmit phase synchronized radar signals from a plurality of receiver/exciter elements. A global positioning system (GPS) carrier phase disciplined oscillator receives the GPS carrier signal at a GPS receiver. The GPS carrier contains phase and timing information to phase synchronize the local clock with the GPS carrier to produce a reference clock signal. The reference clock signal is used to synchronize a frequency synthesizer oscillator clock and generate a stable timing reference signal at a frequency significantly greater than the reference clock frequency. The stable timing reference is used to transmit radar signals in a receiver/exciter pair, the radar signals phase synchronized with the GPS carrier signal. Each receiver/exciter element generates its own stable timing reference based on a common GPS carrier. The radar signals from the plurality of receiver/exciter elements use a common clock without need of a physical distribution mechanism.

An active electronically scanned array (AESA) radar system includes a plurality of transmitter/exciter pairs configured to transmit and/or receive radar signals. The radar Signals from each transmitter/exciter pair are phase synchronized based on an external common timing reference with the other radar signals. A plurality of global positioning system (GPS) carrier phase disciplined oscillators (GCPDOs), wherein each GCPDO corresponds to one of the plurality of transmitter/exciter pairs and receives a GPS carrier signal from a GPS satellite in a GPS constellation and outputs to a corresponding transmitter/receiver pair a stable timing reference based on the received GPS carrier signal.

A distributed radar system having a coherent, synchronized timing reference, includes a plurality of active electronically scanned array (AESA) radar systems. A common control in communication with each of said AESA radar system is configured to transmit to each AESA radar system, control information related to a common stable timing reference, and receive precise GPS location data from each AESA radar system. Each AESA radar system further includes a plurality of receiver/exciter elements, each receiver/exciter element configured to generate a stable timing reference for transmitting and receiving radar signals based on a received GPS carrier signal and said control information.

A method for providing a coherent, synchronized clock signal to a plurality of receiver/exciter elements in an active electronically scanned array (AESA) radar system includes for each receiver/exciter element: receiving a global positioning system (GPS) carrier signal containing timing information and a one pulse per second (1PPS) signal from a GPS satellite in a GPS constellation, providing a local clock signal, synchronizing said local clock signal with said GPS carrier signal to produce a corrected clock signal, processing said corrected clock signal and said local clock signal to produce a stable time reference based on said received GPS carrier signal, and transmitting and/or receiving radar signals synchronized with said stable timing reference based on said received GPS carrier signal.

A method of providing a coherent, synchronized timing reference in a distributed radar system comprising a plurality of active electronically scanned array (AESA) radar systems, includes for each receiver/exciter element of each AESA radar system: receiving control information relating to the distributed radar system and a selected target, receiving a global positioning system (GPS) carrier signal containing timing information of the GPS carrier signal and a one pulse per second (1PPS) signal, providing a local clock signal, correcting the local clock signal to be synchronized with the received GPS carrier signal to produce a corrected clock signal, generating the coherent, synchronized timing reference in a frequency synthesizer based on the local clock signal and the corrected clock signal.

BRIEF DESCRIPTION OF THE DRAWINGS

A better understanding of the description may be had with reference to the accompanying drawings in which.

DETAILED DESCRIPTION

Reference will now be made in detail to exemplary embodiments, examples of which are illustrated in the accompanying drawings.

Figure 1:
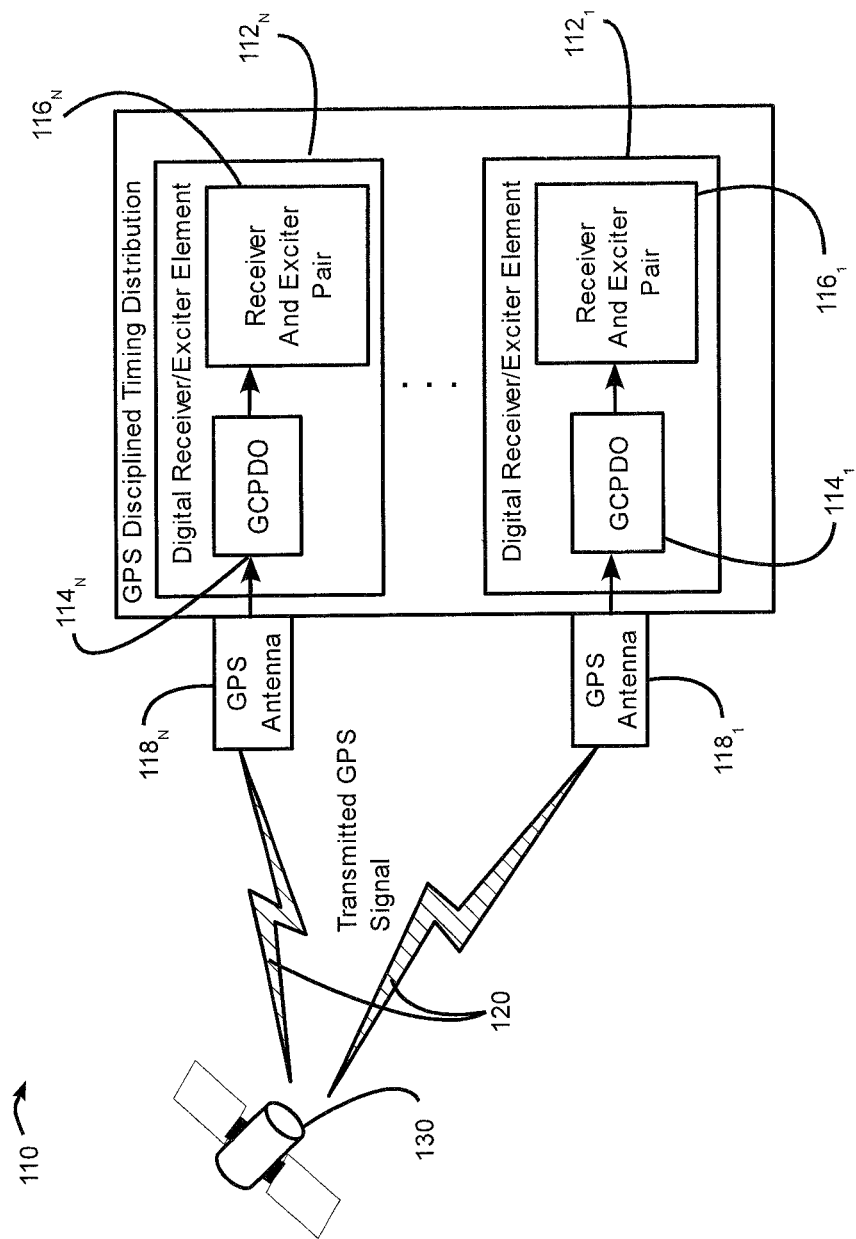
FIG. 1 shows a system diagram of an AESA radar system incorporating a GPS carrier phase disciplined oscillator for each digital receiver/exciter pair according to an exemplary embodiment.
Figure 2:
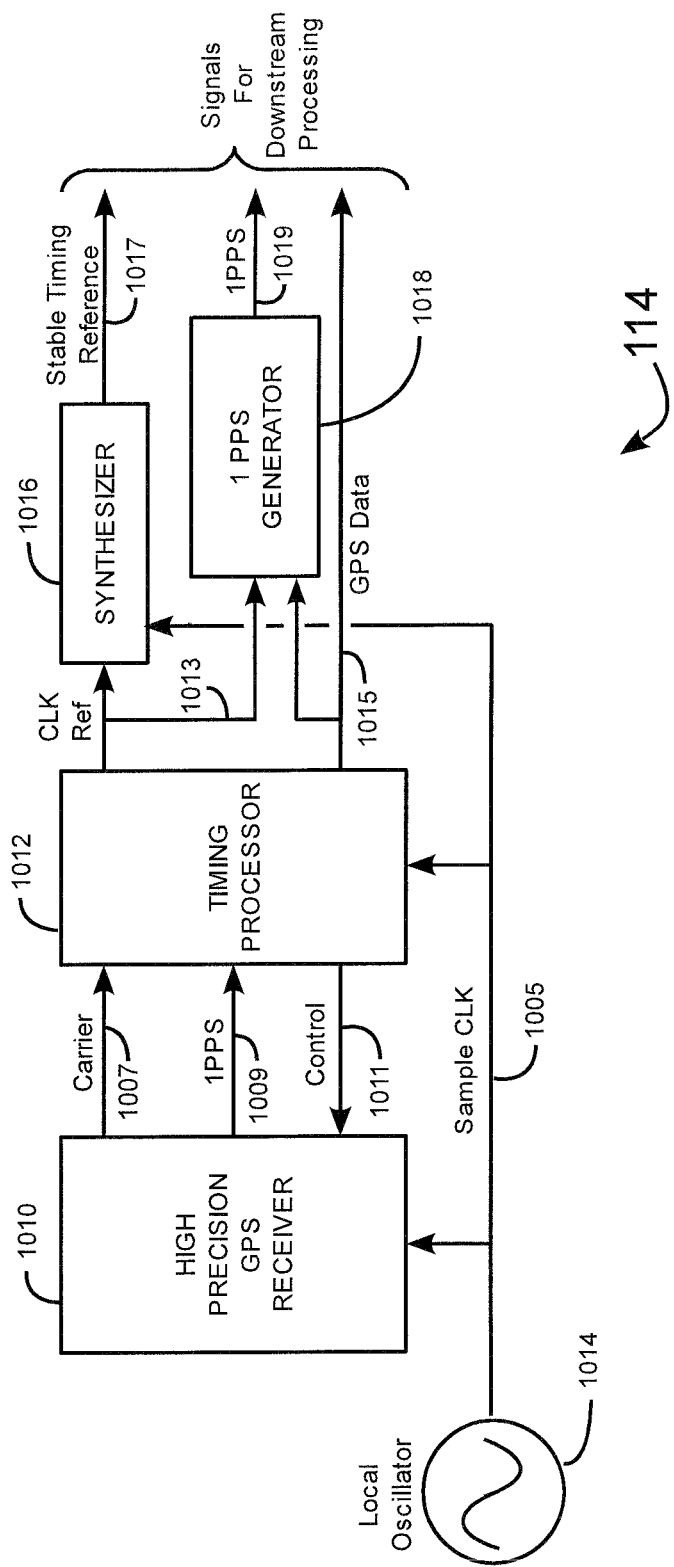
FIG. 2 shows a block diagram of the functional components of a GPS carrier phase disciplined oscillator according to the exemplary embodiment of FIG. 1.

FIG. 1 shows an AESA radar system 110 having an array of digital receiver/exciter elements referred to collectively as reference numeral 112 (where each digital receiver/exciter element may be identified as $112_i$ where i=1, ..., N). AESA radar system 110 is configured to receive GPS signals 120 from a GPS satellite 130 in a GPS satellite constellation for input to corresponding GPS carrier phase disciplined oscillators ("GCPDO") $114_1$-$114_N$ via respective GPS antennas $118_1$-$118_N$. Each GCPDO 114 is configured to receive the GPS signals 120 from GPS antenna 118, utilize the GPS signal carrier phase to synchronize a respective local oscillator (LO) 1014 (as shown in FIG. 2) such that all digital receiver/exciters elements 112 are phase and frequency locked, and provide a coherent clock to an array element receiver and exciter pair $116_1$-$116_N$. This exemplary embodiment utilizes the timing source (e.g. cesium timing source) within each of the GPS satellites as the master timing reference and phase locks each of the local oscillators for each receiver/exciter pair to that timing reference received by each of the embedded GPS receivers. Accordingly, this approach provides a synchronous timing source for each exciter and receiver pair 116 without the need for a complex distribution network. By receiving and exploiting directly the GPS carrier as the common reference for each receiver/exciter pair, each pair within the radar array has a clock reference that is coherent with respect to all other receiver/exciter pair clock references, thereby eliminating the current requirements for long cables, compensation mechanisms, and heavy infrastructures necessary for a master timing reference.

It is well known that GPS carrier phase and GPS data (e.g. timing data) may be recovered from a received GPS signal. Therefore, details of conventional processing steps for recovering such data is omitted herein for purposes of brevity. AESA radar system 110 may be implemented without need for distributing a master timing reference through a complex distribution network. Rather, the GCPDO of each digital receiver/exciter element 112 is configured to generate a clock that is phase coherent with all of the other digital receiver/exciter elements 112.

FIG. 2 shows a block diagram of the functional components of the GCPDO shown in FIG. 1 embedded in each digital receiver/exciter element 112. A local oscillator (LO) 1014 provides a timing source (e.g. sample CLK) for the components of GCPDO 114. LO 1014 may be a typical ultra-stable oscillator, for example, a rubidium oscillator, a double oven controlled crystal oscillator (DOCXO), a chip scale atomic clock (CSAC)) or other such oscillator.

GCPDO 114 includes a GPS receiver 1010. GPS receiver 1010 may be a typical GPS receiver configured to receive GPS signals 120 (shown in FIG. 1) from a GPS antenna 118 (shown in FIG. 1) and to output both the carrier phase and the received 1PPS signal to a timing processor 1012. GPS receiver 1010 is configured to accurately measure the GPS carrier phase to less than 17° (degrees). GPS receiver 1010 may additionally be configured to operate in response to control signals from timing processor 1012. By way of example, timing processor 1012 may output a control signal 1011 selecting a specific GPS satellite in the GPS satellite constellation from which to receive GPS signals. Timing processor 1012 may select a particular satellite to use as a phase reference based on signal strength, Doppler shift, elevation angle, satellite clock type, or other parameters. Timing processor 1012 of GCPDO 114, is configured to control the GPS receiver 1010, via control signal 1011, for example, by optimally selecting the proper satellite with which to synchronize its clock. By way of example, a GPS satellite may be selected from the GPS satellite constellation on the basis of the highest signal to noise ratio (SNR). In an AESA radar system consisting of multiple receiver/exciter element pairs, one receiver/exciter element acts as a master element to select the GPS satellite for all receiver/exciter elements in the radar system. All receiver/exciter elements, therefore, use the same GPS signal, originating from a common GPS satellite, to provide the phase synchronized reference clock 1013. The reference clock 1013 is thus common across all receiver/exciter elements. The common reference clock 1013 provides an accurate, coherent timing reference across the radar system (i.e. to all receiver/exciter elements) without the need for a complex and cumbersome distribution mechanism. Timing processor 1012 further utilizes the carrier phase 1007 and the 1PPS signal 1009 to generate a clock signal to maintain synchronization. Timing processor 1012 uses these timing signals to generate a band limited phase corrected reference clock 1013 that is phase synchronous to the GPS carrier 1007. For example, the reference clock 1013 may be a 10 MHz signal having a phase accuracy to the GPS carrier 1007 of about 10 ps. The reference clock 1013 is of a frequency significantly lower than the stable timing reference 1017 generated by synthesizer 1016 which is used to transmit and receive radar signals. The reference clock 1013 output from timing processor 1012 is band limited to maintain jitter and phase noise performance. Timing processor 1012 may further be configured to output GPS data 1015 recovered from the 1PPS signal (e.g. position data, time data, etc.) for downstream processing.

GCPDO 114 further includes a digital synthesizer 1016 configured receive the CLK 1013 from timing processor 1012 and the sample CLK 1005 from LO 1014: Synthesizer 1016 is configured to produce the required phase synchronous frequency reference 1017 (i.e. stable timing reference) for use within each exciter/receiver. Stable timing reference 1017 has a high degree of stability (e.g. the phase accuracy of the stable timing reference may be about 33 femtoseconds (fs)). Synthesizer 1016 is configured to output a stable timing reference having a frequency significantly higher than the reference clock 1013. By dividing the frequency signal generated by the synthesizer oscillator and synchronizing the lower (downshifted) frequency signal with the reference clock 1013, and multiplying the synchronized signal to upshift the synthesized signal back to its design frequency, the phase accuracy of the stable timing reference 1017 is a multiple of the reference clock 1013 phase accuracy. The phase accuracy of the reference clock 1013 is multiplied by the same factor as the underlying frequencies of the reference clock and the stable timing reference.

For example, a 3 GHz stable timing reference 1017 is generated and synchronized to a 10 MHz reference clock 1013 having a phase accuracy of about 10 picoseconds (ps) with respect to the GPS carrier 1007. The stable timing reference 1017 thus has a phase accuracy on the order of 300 times the reference clock (10 MHz×300=3 GHz). Thus, the stable timing reference 1017 generated by synthesizer 1016 may have a phase accuracy to the GPS carrier 1007 of 10 ps÷300=33 fs.

Synthesizer 1016 outputs the stable timing reference signal 1017 for downstream processing. Synthesizer 1016 may be configured to phase synchronize the stable timing reference 1017 on a periodic basis, for example every 5 or 10 seconds. The period for phase synchronization may be established in accordance with the type and features/capabilities of the LO 1014. By way of example only, a OCXO LO 1014 has very good short term stability, for example, on the order of about 10 or 20 seconds. Thus, a period for phase synchronizing OCXO LO 1014 may be selected to be within the stable time interval of the device, such as 5 or 10 seconds. Alternatively high stability LOs, such as rubidium LOs, may implement different time periods. Still other embodiments of the synthesizer 1016 may implement a phase-locked loop (PLL) to essentially continuously (i.e. in real-time) phase synchronize LO 1014. This may be advantageous for embodiments implementing lower stability LOs. Independent of the method by which synthesizer 1016 phase synchronizes the stable timing reference 1017, synthesizer 1016 continuously outputs the stable timing reference 1017 for downstream processing (e.g. to array element receiver and exciter 116 shown in FIG. 1). By synchronizing the sample CLK 1005 with the reference clock 1013 recovered from the GPS carrier phase, the stable timing reference 1017 output from the synthesizer 1016 of each GCPDO 114 throughout the entire phased radar array is phase coherent, and provides a common timing reference across all receiver/exciter elements in the radar system.

GCPDO 114 additionally includes a 1PPS generator 1018. 1PPS generator 1018 is configured to receive reference clock 1013 and GPS data 1015 from timing processor 1012 and to output a synchronized 1PPS signal 1019 for downstream processing that is phase synchronized to the GPS carrier 1007.

By way of non-limiting example only, GCPDO 114 may include various hardware, firmware, and software components on a field-programmable gate array (FPGA). LO 1014 may be a commercial off-the-shelf LO, for example a rubidium LO or CSAC. GPS receiver 1010 may be any processing unit configured to receive GPS signals and a control signal 1011 and output the GPS carrier phase 1007 and 1PPS signal 1009. As the accuracy of commercial off-the-shelf GPS survey quality receivers improves, GPS receiver 1010 may be a GPS survey quality receiver configured/modified to utilize the carrier phase for timing rather than position. Timing processor 1012 may be any processing unit configured to provide control signals 1011 to a GPS receiver, receive a 1PPS GPS signal 1009 and a GPS carrier phase 1005, and output both the GPS data 1015 and a highly accurate clock signal 1013. Synthesizer 1016 may be any processing unit configured to receive a sample clock 1005 and a reference clock 1013 and to output a stable timing reference 1017 generated by synchronizing the sample clock 1005 with the reference clock 1013. 1PPS generator 1018 may be any processing unit configured to receive a reference clock signal 1013 and output a 1PPS signal 1019.

While the exemplary embodiment of GCPDO 114 illustrated in FIG. 2 shows only the above-identified components, it is understood that additional components may be implemented as part of GCPDO 114 according to design requirements and limitations. Additionally, while the discussion of the exemplary embodiment of FIG. 2 provides "blocks" as separate elements, it is understood that any/all elements and/or functions may be implemented in greater or fewer separate discrete components.

Figure 2A:
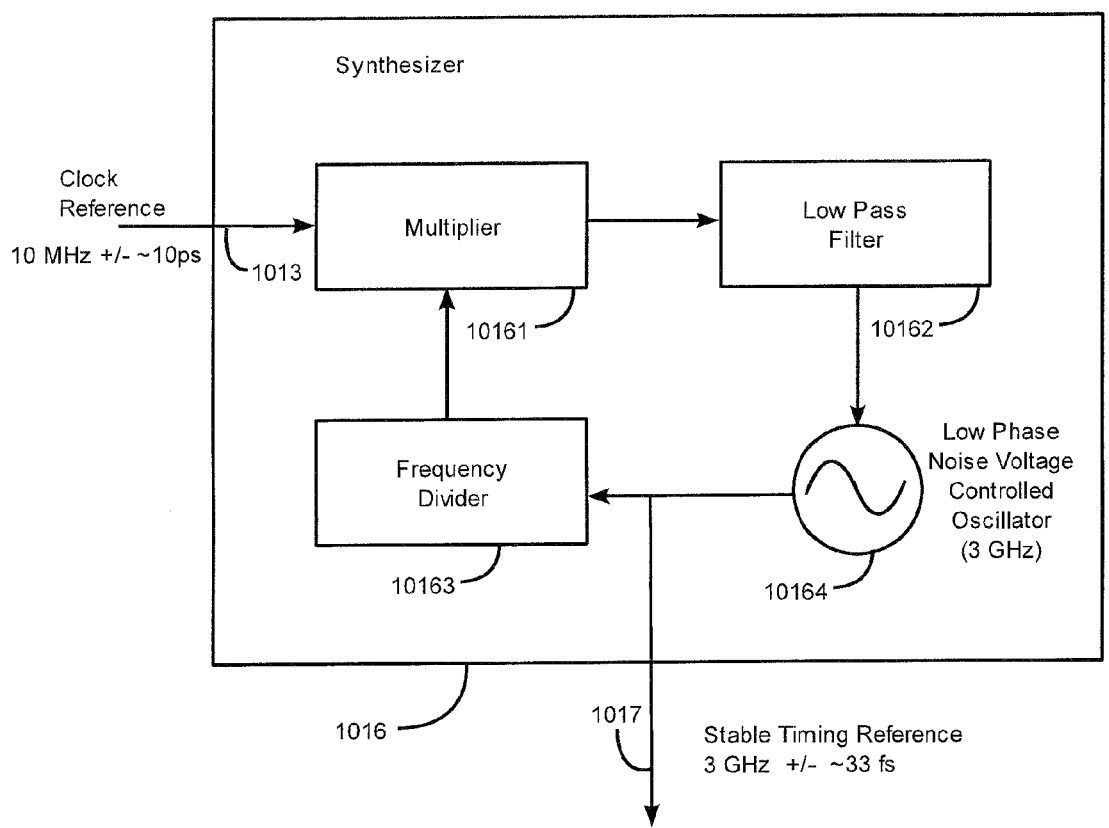
FIG. 2A shows a block diagram of a frequency synthesizer for generating a stable timing referenced based on a common, coherent clock reference synchronized to a GPS carrier.

FIG. 2A shows a block diagram of a frequency synthesizer 1016 configured to output a stable timing reference 1017. By way of non-limiting example, a reference clock 1013, having a frequency of 10 MHz is phase synchronized to a GPS carrier 1007 (shown in FIG. 2) to within about 10 ps. Synthesizer 1016 comprises a low phase noise voltage controlled oscillator (VCO) 10164 adapted to output an application specific frequency signal, for example, an S-band radar signal of 3 GHz. The VCO 10164 output is passed to a frequency divider 10163 which downshifts the frequency of the VCO 10164 output. The downshifted signal is phase synchronized with the reference clock 1013. The reference clock 1013, by way of example, may be a 10 MHz corrected clock signal based on a local oscillator sample clock 1005 (shown in FIG. 2) phase synchronized to a received GPS carrier 1007 (shown in FIG. 2) and accurate to within about 10 ps relative to the GPS carrier. The synchronized downshifted signal is then multiplied in multiplier 10161 and passed through a low pass filter 10162. The filtered and synchronized signal is then used to synchronize the signal from the low phase noise VCO 10164, completing a phase locked loop within synthesizer 1016. The phase locked signal is output as a stable timing reference 1017 at the application frequency (e.g. 3 GHz in FIG. 2A). The stable timing reference is phase locked to the GPS carrier signal 1007 (shown in FIG. 2) through reference clock 1013, the GPS carrier being commonly received by all receiver/exciter elements in the AESA radar system. In this way, the GPS carrier provides a common timing reference that is sufficiently phase accurate to the GPS carrier to all receiver/exciter elements providing coherent timing for the radar system without a complex and cumbersome distribution system. The reference clock 1013, which is phase accurate to the GPS carrier within about 10 ps, when applied to the downshifted signal in the frequency synthesizer 1016, provides accuracy that is multiplied when the synchronized signal is upshifted to the application frequency of the synthesizer 1016. In other words, a reference clock 1013 that is accurate to 10 ps of the GPS carrier phase, results in a stable timing reference 1017 that is phase accurate by a multiple equal to the multiple of the synthesizer frequency with respect to the reference clock 1013 frequency. Thus, a 10 MHz reference clock 1013 signal phase accurate within 10 ps, will produce a stable timing reference 1017 of 3 GHz (300 times reference clock frequency) having a phase accuracy of about 33 fs (10 ps÷300).

Figure 3:
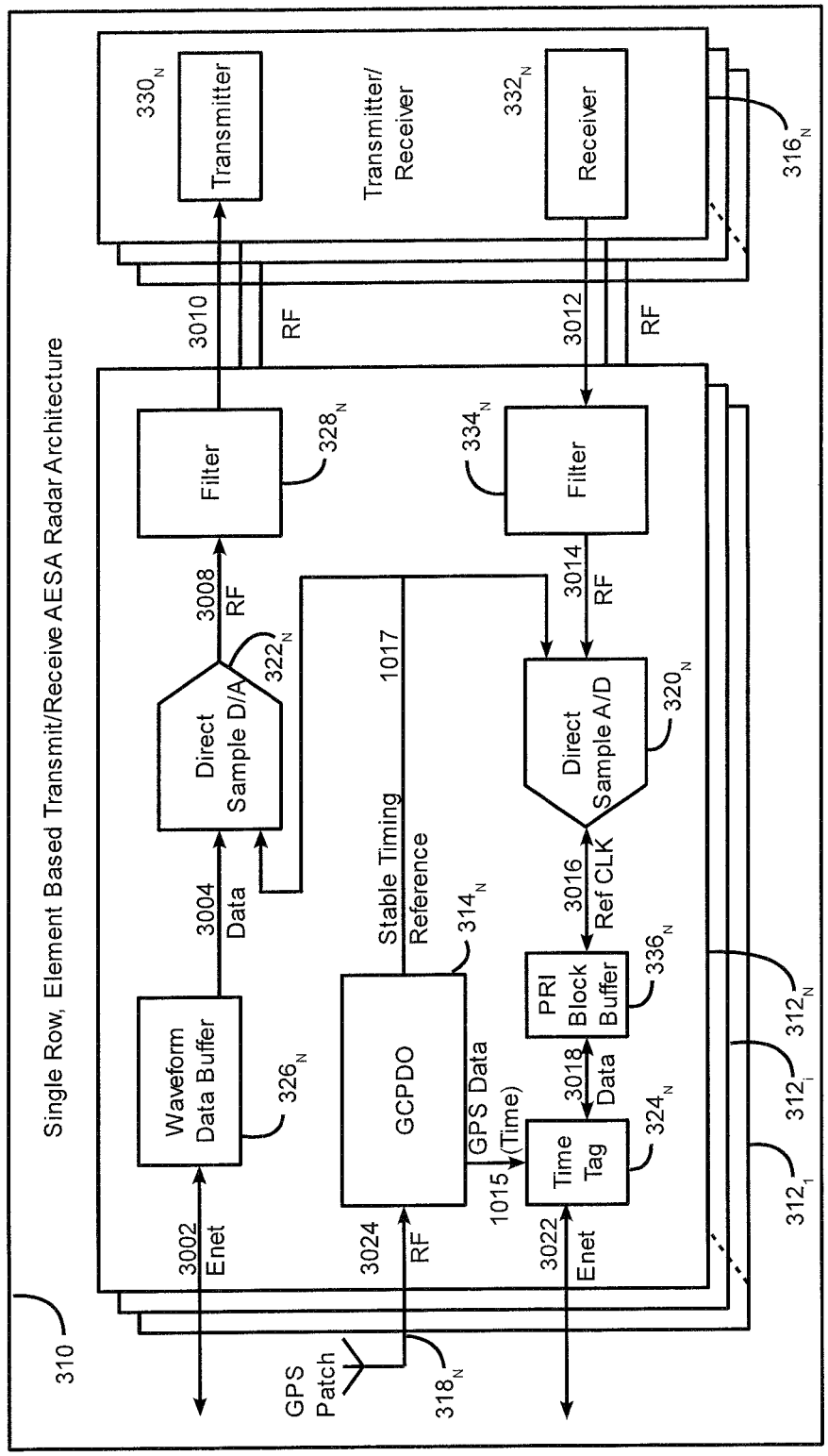
FIG. 3 shows a block diagram illustrating an exemplary architecture of an AESA radar system including a plurality of distributed exciter/receiver elements wherein a GPS carrier phase disciplined oscillator is embedded on each distributed exciter/receiver pair.

FIG. 3 shows a block diagram illustrating an exemplary architecture of an AESA radar system including a plurality of distributed exciter/receiver elements having a GCPDO embedded on each distributed exciter/receiver pair. Each embedded GCPDO 314 locally generates a stable timing reference 1017 that is phase and frequency coherent with all other distributed exciter/receiver elements 312. The GPS carrier-phase synchronization technique provides substantial improvement in accuracy over utilizing the recovered 1 PPS data modulated on the GPS carrier. The following description refers to components associated with receiver/exciter element $312_N$. It should be noted that all elements $312_1$-$312_N$ include similar components operating in a similar fashion which have not been shown to avoid excess detail and provide a better understanding of the embodiment shown.

The architecture illustrated in the block diagram of FIG. 3 may operate to transmit and receive coherent phase synchronized radar signals. The block functional components of the AESA radar system shown in FIG. 3 are generally referred to by their function and are not limited to specific devices or elements. AESA radar system 310 may implement only conventional, well-known AESA radar elements in combination with GCPDO 314 to achieve frequency and phase synchronization without requiring distribution of a master timing reference. Each of the conventional elements or blocks may be embodied in conventional hardware, firmware, software or any combination thereof in accordance with individual design requirements and limitations.

Each GPS antenna $318_N$ may be a conventional GPS antenna (e.g. a GPS patch antenna) configured to receive GPS signals 120 (shown in FIG. 1) from GPS satellite 130 (shown in FIG. 1) and output GPS signals 120 to embedded GCPDO $314_N$ via transmission line 3024. The GCPDO $314_N$ embedded on each distributed exciter/receiver element $312_N$ is configured to recover the GPS carrier phase from a GPS signal 3024 and to use the GPS carrier phase, in combination with a local oscillator, to provide a phase coherent stable timing reference signal 1017 to both the direct sample analog-to-digital converter $320_N$ and to direct sample digital-to-analog converter $322_N$. Embedded GCPDO $314_N$ may additionally provide time and/or date information 3020 transmitted from the GPS satellite to time tag element $324_N$.

AESA radar system 310 may be configured to transmit radar data as follows. A waveform data buffer $326_N$, included in each distributed exciter/receiver 312 is configured to receive data via transmission line 3002, store the waveform data in a buffer $326_N$, and output the data to a direct sample digital-to-analog converter $322_N$. By way of example, waveform data buffer $326_N$ may be a conventional buffer, such as a register or memory. Direct sample digital-to-analog converter $322_N$ is configured to receive data from waveform data buffer $326_N$ and receive a stable timing reference 1017 from embedded GCPDO $314_N$. The stable timing reference 1017 output by GCPDO $314_i$ is phase locked with the stable timing reference 1017 output by GCPDO $314_1$-GCPDO $314_N$ (i.e. the CLK in all distributed exciter/receiver elements of AESA radar system 310 are phase locked). Stable timing reference 1017 is common to all receiver exciters in the radar system and is phase accurate to a received GPS carrier to within 33 fs for a 3 GHz signal, as described herein with respect to FIGS. 2-2A. Because the GPS carrier is common to all receiver/exciter elements in the radar system, and the stable timing reference 1017 generated by each receiver/exciter element is accurate to the common GPS carrier, all of the receiver/exciter elements are coherently phase synchronous with each other without a physical distribution network, for example, direct cabling. Direct sample digital-to-analog converter $322_N$ is further configured to convert the received digital data 3004 into a phase synchronized analog signal 3008 and to output the signal to filter $328_N$. Filter $328_N$ is configured to receive at an input the phase synchronized analog signal 3008 output from direct sample digital-to-analog converter $322_N$, perform conventional filtering steps common to radar transmission (e.g. reducing out of band spurious signal components (i.e. smoothing)), and output a filtered, phase synchronized analog signal 3010 to transmitter $330_N$. Transmitter $330_N$ is configured to receive the filtered, phase synchronized analog signal 3010 and to transmit that signal at its output.

AESA radar system 310 may be configured to receive radar data as follows. Transmitter/receiver $316_N$ includes a conventional receiver $332_N$ configured to receive radar signals 3012 and to output the received radar signals to filter $334_N$. A conventional filter $334_N$ is configured to receive radar signals 3012 output from receiver $332_N$, perform radar filtering functions on the received radar signals such as bandwidth limiting (e.g. limiting the bandwidth spectrum to not exceed the A/D sampling bandwidth), and output filtered radar signals 3014 to direct sample analog-to-digital converter $320_N$. Direct sample analog-to-digital converter $320_N$ is configured to receive radar signals 3014 from filter $334_N$ and a stable timing reference 1017 from GCPDO $314_N$, convert the received analog radar signal 3014 to digital data 3016 and output the digital data 3016 to PRI block buffer $336_N$. PRI block buffer $336_N$ is configured to receive radar data 3016 from direct sample analog-to-digital converter $320_N$, store all radar data 3016 for a single pulse repetition interval (PRI) for association with a given transmit time, and transmit the stored radar data 3018 for a PRI to time tag element $324_N$. Time tag element $324_N$ is configured to receive radar data from PRI block buffer $336_N$ and time/date information (GPS data 1015) from GCPDO $314_N$, modify the received radar data 3018 to tag it with the time/date of its reception, and output time tagged data 3022 for downstream processing at an output.

AESA radar system 310 illustrated in FIG. 3 incorporates an embedded GCPDO 314 on each distributed exciter/receiver element 312. Such a design provides the advantage that each distributed receiver/exciter element 312 may operate independently, achieving phase synchronization without necessitating distribution of a master timing reference through a complex distribution network. Advantageously, because AESA radar system 310 does not require a complex distribution network to distribute a master timing reference through array elements, the array may be scalable beyond the limitations of those requiring complex distribution networks.

Figure 4:
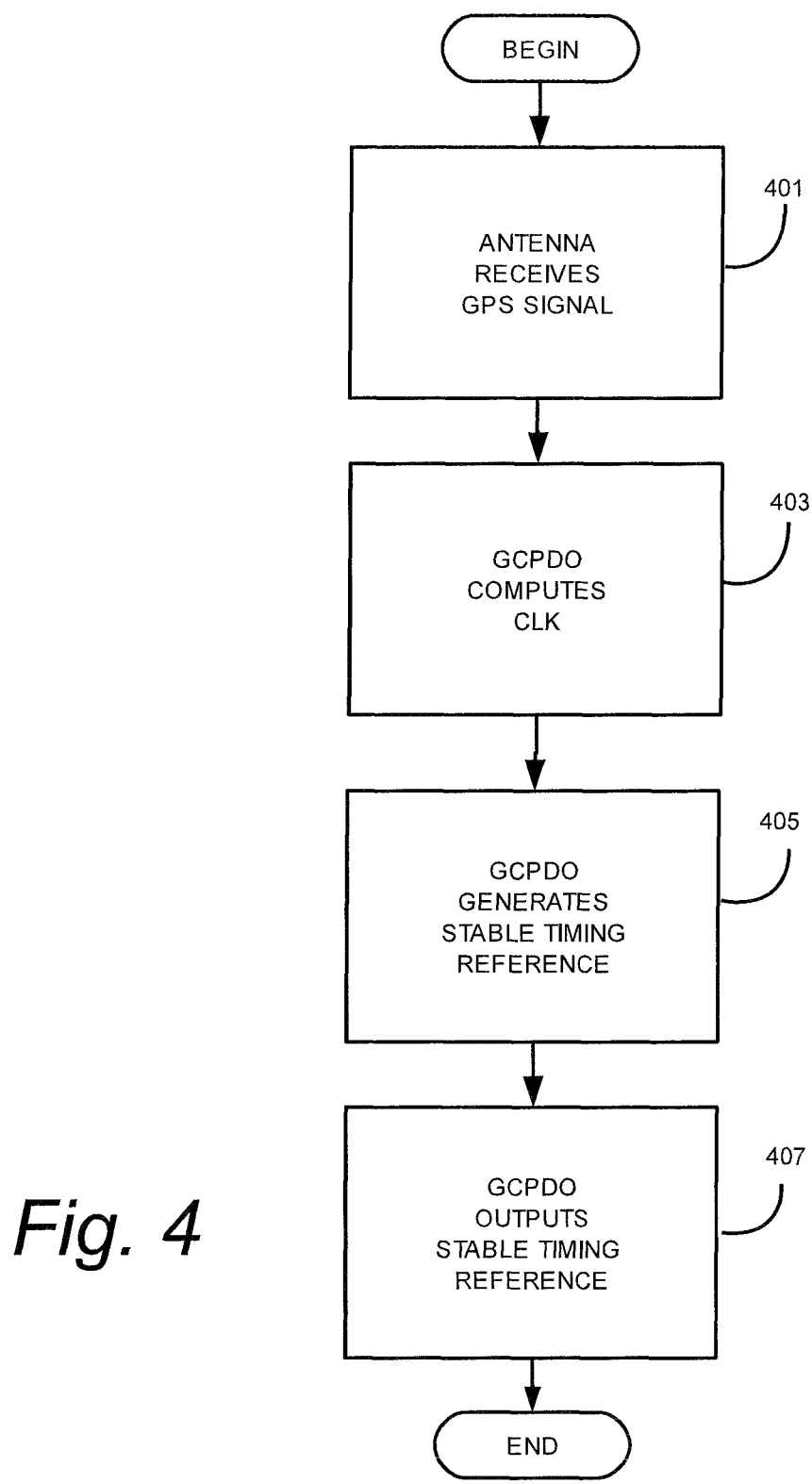
FIG. 4 illustrates a process flow for providing a coherent timing reference for each receiver/exciter pair of an active phased array radar system according to an embodiment of the present invention.

FIG. 4 illustrates a process flow for providing a coherent timing reference to all receiver/exciter pairs of an active phased array radar system according to an exemplary embodiment of the present invention. A GPS antenna is configured to receive GPS signals from a GPS satellite in a GPS constellation (block 401). By way of non-limiting example, the GPS antenna may receive an L1 (1575.42 MHz) signal from a GPS satellite. The L1 code includes a modulation of at least navigation message code, course acquisition (C/A) code, and encrypted precision P(y) code. The GPS antenna provides the GPS signal to a GPS carrier phase disciplined oscillator (GCPDO) via a conventional method, for example via a transmission line such as a line trace or cable. The GCPDO, which may comprise software, firmware, and hardware in combination thereof, receives the GPS carrier signal from the GPS antenna and performs processing to generate a reference clock from the GPS 1PPS signal and the GPS carrier phase (block 403). For example, reference clock signal may be a 10 MHz reference clock that is phase synchronized with the GPS carrier to within 10 ps. The reference clock signal is input to a synthesizer of the GCPDO and processed with a downshifted frequency signal to synchronize the downshifted signal with the reference clock signal, thereby generating a stable timing reference (block 405). Each GCPDO outputs a common stable timing reference to each respective exciter/receiver pair in the active phased array radar system (block 407). Thus, the stable timing references output to each exciter/receiver pair in the active phased array radar system are phase coherent (i.e. phase locked to a common GPS carrier signal).

In accordance with an alternative exemplary embodiment, a GCPDO may be implemented to provide phase coherence between multiple separate radar systems. This may be particularly beneficial in systems such as multiple-input multiple-output radar systems ("MIMO systems"). MIMO systems utilize multiple radars (i.e. N radars) configured to coherently transmit signals toward a target (i.e. paint a target) so that the signals from each radar arrive at the target at the same time. Each radar transmits one of a set of N orthogonal waveforms and each receives all N waveforms. In this fashion, there are $N^2$ channels of target returns. If each channel observes the same signal-to-noise ratio (SNR), coherent combination of the channels may potentially generate an SNR gain of $N^2$. MIMO may be considered as a means of bootstrapping to obtain greater coherent gain. By transmitting coherently from all N apertures and by coherently combining each of the channels prior to processing, MIMO systems may achieve an $N^3$ SNR gain. Present MIMO systems, however, have failed to achieve this ideal because of a lack of phase coherency amongst transmitters due in part to phase drift.

Figure 5:
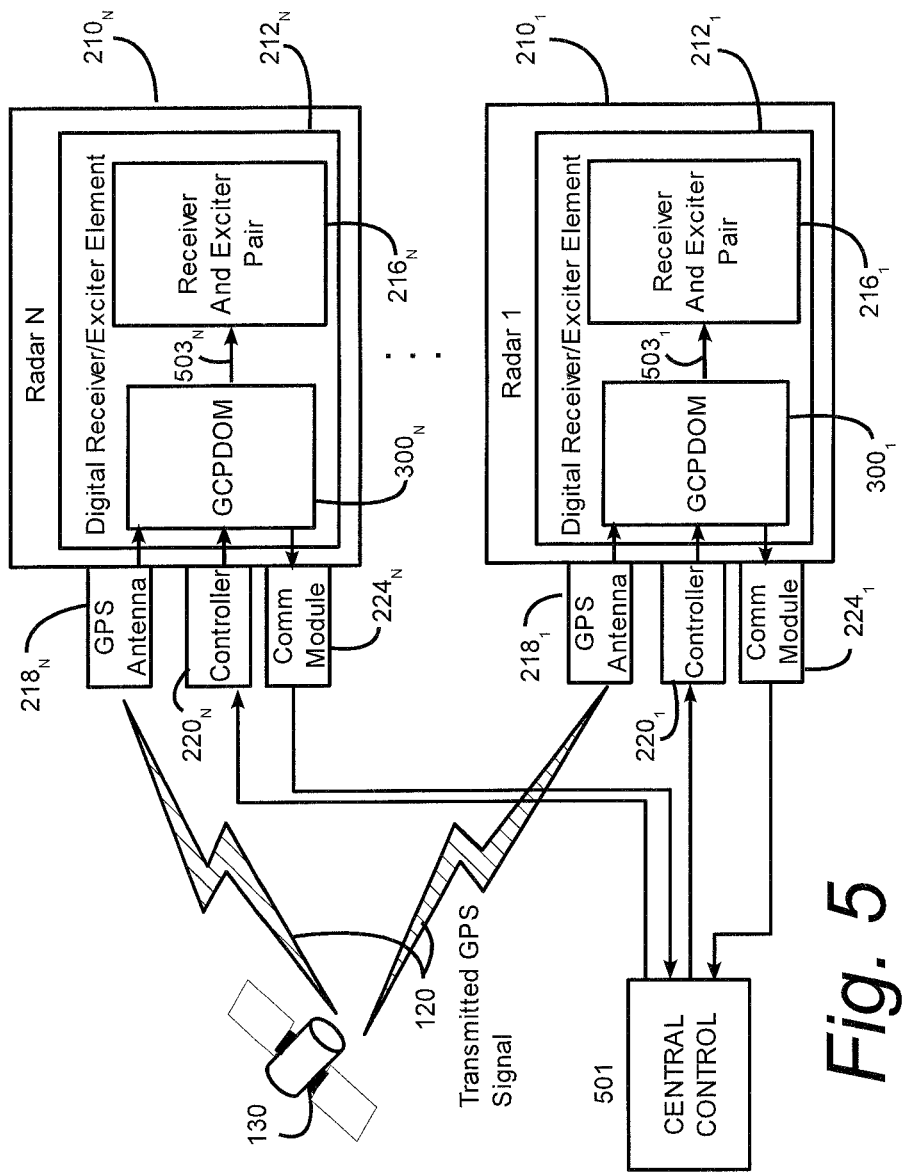
FIG. 5 shows a system diagram for a distributed radar system including a plurality of AESA radars, each AESA radar having a respective GPS carrier phase disciplined oscillator module according to another exemplary embodiment.

FIG. 5 shows an embodiment having a plurality of AESA radars $210_1$-$210_N$. Each radar 210 includes a GPS carrier phase disciplined oscillator module (GCPDOM) $300_1$-$300_N$ configured to provide a coherent timing reference to each of the AESA radars 210 in the distributed radar system. Each AESA radar 210 may be a conventional AESA radar or may be an AESA radar system such as those described above in FIG. 1. Further, while FIG. 5 illustrates each AESA radar 210 having a single digital receiver/exciter element 212, each AESA radar 210 may have a plurality of digital receiver exciter elements 212. Each AESA radar 210 includes an embedded GCPDOM 300 configured to receive GPS signals 120 and provide a coherent timing reference (i.e. clock) $503_1$-$503_N$ to the receiver and exciter pairs $216_1$-$216_N$. In contrast to the AESA radars described in FIGS. 1-4, in order for the AESA radars 210 of FIG. 5 to be phase locked, the stable timing reference 503 is phase locked such that the signal power transmitted from all radars 210 arrives at a target simultaneously. The degree of accuracy required for phase lock may be highly application dependent. Phase lock may require, by way of example, synchronization within five degrees of the transmit frequency (e.g. ~5 fs for 3 GHz). To compute an appropriate transmit delay to accomplish this, each GCPDOM 300 maintains the following information data: (1) its own physical location to a high degree of specificity based on the GPS signal carrier phase, (2) AESA radars within the system that will be transmitting simultaneously, (3) the physical location of each other AESA radar that will be transmitting simultaneously, and (4) the direction in which the transmitter will be transmitting. Each radar system 210 is configured to then calculate the required transmit delay for the transmission so that transmission from each transmitter arrives at the target simultaneously.

Each AESA radar 210 determines its location to a high degree of precision based on the received GPS carrier signal. The location of the AESA radar 210 may be determined by the GPS receiver that is part of the GCPDOM 300 upon receiving the GPS signal 120 transmitted from GPS satellite 130 and received via GPS antenna $218_1$-$218_N$. The AESA radar 210 then transmits its location to a central control 501 via a communications module $224_1$-$224_N$. By way of example, central control 501 may be a military base having a command and control function. Each AESA radar 210 is also equipped with a controller $220_1$-$220_N$ that is configured to receive control information from central control 501. The control information received may include information necessary for the AESA radar 210 to compute the appropriate delay such that the transmitter from the AESA radar 210 reaches an intended target at the same time and synchronized with the other AESA radar systems 210. Such control information, as described above, may relate to AESA radar systems 210 that will be transmitting simultaneously, the location of the AESA radar systems 210 that will be transmitting simultaneously, and the location of the intended target. Additionally, all AESA radars utilize the GPS carrier phase to synchronize their local oscillators (as described with reference to FIGS. 1-4) to ensure that the calculated transmit delay, specific to each AESA radar, results in a delay from a coherent reference time.

In an alternate embodiment, a coherent, phase synchronized reference signal may generated at the central control 501 and transmitted to the control module 220 of AESA radar system 210. Based on the location of the AESA radar system 210 receiving the timing reference from central control 501, the central control may also calculate the appropriate delay for each AESA radar system 210 and transmit control information indicative of the appropriate delay to enable simultaneous target impingement.

Figure 6:
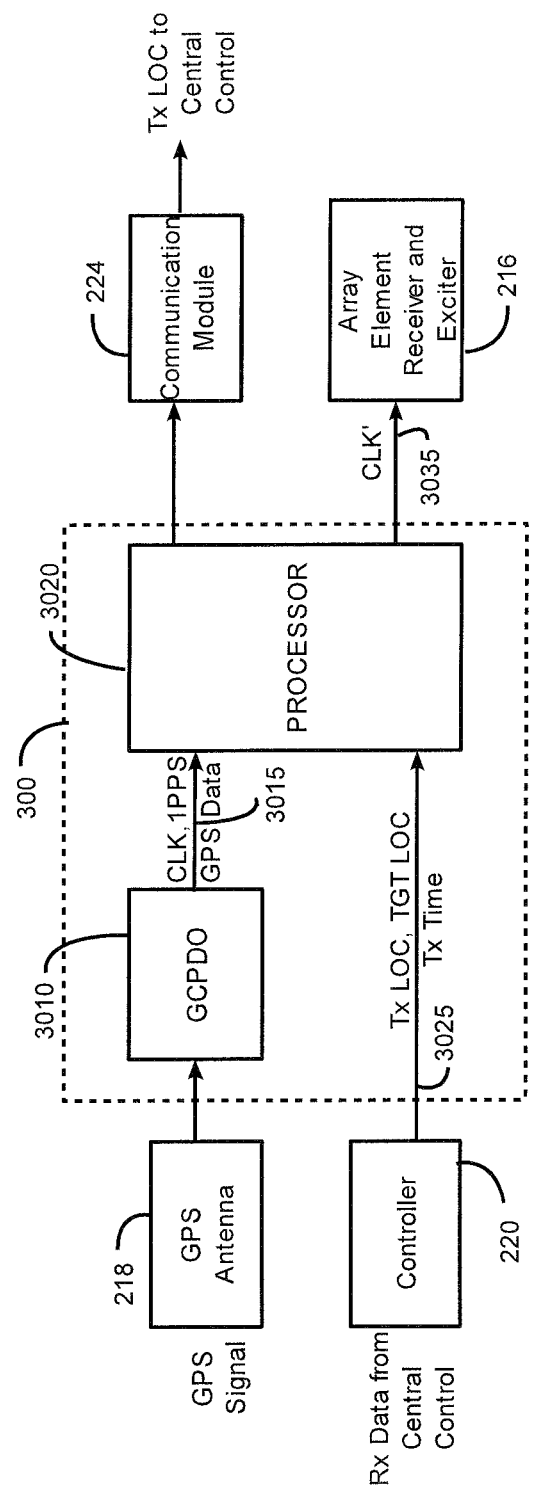
FIG. 6 shows a block diagram of the functional components of a GPS carrier phase disciplined oscillator module according to the exemplary embodiment of FIG. 5.

FIG. 6 is a block diagram of the functional components of a GCPDOM 300 according to the exemplary embodiment of an AESA radar of FIG. 5. GCPDOM 300 includes a GCPDO 3010 configured to receive GPS signals from a GPS antenna 218 and to output to processor 3020 a highly stable timing reference (CLK) 3015, a 1PPS signal, and the GPS data received from the GPS signal 3005. GCPDO 3010 may be configured in similar fashion to GCPDO 214 described with reference to FIGS. 1-4.

A controller 220 may be configured to output various control data to GCPDOM 300, including data indicating which AESA radars 210 in the system will be transmitting signal power at the target simultaneously with the radar 210 and each transmitting radar's location ($T_x$ LOC), the location or direction of the target (i.e. transmission direction) (TGT LOC), and the time that each radar will simultaneously transmit signal power at the target ($T_x$ Time) 3025. Controller 220 may, by way of non-limiting example, receive such data over a communications link, such as a wired or wireless communication link for example, from a central control 501 (shown in FIG. 5). Controller 220 then outputs the received control data 3025 to processor 3020.

Processor 3020 is configured to determine its precise location, such as within 10 millimeters (mm), based on CLK, 1PPS signal and GPS data 3015 each output from GCPDO 3010. Processor 3020 is configured to output the precise location of the AESA radar to phase to communication module 224. Communication module 224 is configured to transmit the precise location of the AESA radar to central control 501 (shown in FIG. 5) (e.g. a military base) in conventional fashion, such as via a wired or wireless communications infrastructure (shown in FIG. 5).

Processor 3020 is further configured to generate a phase shifted clock (CLK') 3035 to output to array element receiver and exciter 216. CLK' 3035 is phase shifted to enable the wave fronts to coherently combine at the target based on (1) the location of AESA radar 210 (LOC) (2) the location of each other simultaneously transmitting AESA radar ($T_x$ LOC), and (3) the location of the target (TGT LOC). Thus, processor 3020 outputs a CLK' 3035 to the array element receiver and exciter 216 to enable transmission of all AESA radars in the system to coherently combine at the target.

Each simultaneously transmitting AESA radar 210 determines its own precise location in the exemplary embodiment of FIG. 6. Such a method may advantageously allow AESA radars to be moved between transmissions and still enable transmissions to coherently combine at a target. In alternative embodiments, the location of each AESA radar may be surveyed prior to setup so that central control may provide the controller with the precise location of each radar system.

In the exemplary embodiment of FIG. 6 processor 3020 computes CLK' 3035 based on a plurality of inputs. In an alternative exemplary embodiment, much of the processing may be performed at a central command 501 (shown in FIG. 5) and an appropriate time delay may be provided to controller 220. Accordingly, a processor 3020 may not be configured to compute the differential locations of each other transmitting AESA radar and may not need to compute the appropriate time delay. Rather, processor 3020 may be configured to utilize the pre-computed time delay from controller 220 and the CLK, 1PPS, and GPS data signals 3015 output from GCPDO 3010 to generate CLK' 3035. Processor 3020 may then output CLK' 3035 to array element receiver and exciter $216_i$, enabling the wave fronts of transmitted power of all transmitting radars to coherently combine at the target. This alternative embodiment beneficially reduces the complexity of computations performed by each GCPDOM 300.

Figure 7:
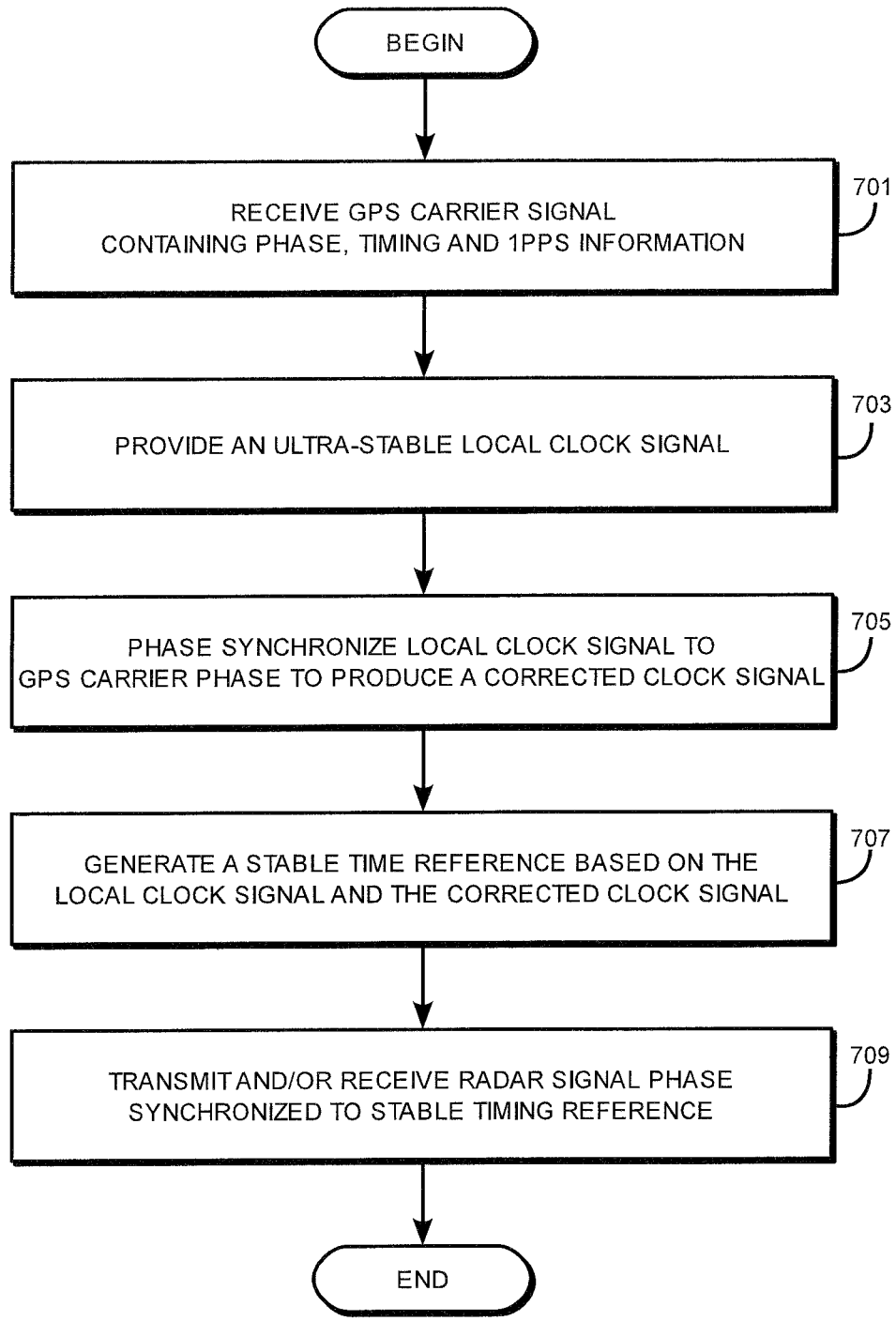
FIG. 7 illustrates a process flow for providing a coherent synchronized timing reference to plurality of receiver/exciter pairs.

Referring now to FIG. 7, a process flow 700 is illustrated for providing coherent, synchronized timing reference to a plurality of receiver/exciter pairs in an AESA radar system. For each receiver/exciter pair in the AESA radar system, the process flow 700 begins by receiving a GPS carrier signal (block 701). The GPS carrier signal contains timing information, including the phase information of the GPS carrier signal as well as timing data. A 1 PPS signal may be received from the GPS satellite containing further timing data which may be used to synchronize to the phase of the GPS carrier signal. Each receiver/exciter pair has an associated GCPDO including a local ultra-stable oscillator that provides a local clock signal (block 703). By way of non-limiting example, the local oscillator may be a rubidium oscillator, an OCXO oscillator, or a CSAC oscillator. Based on the phase and timing information received in the GPS carrier signal, the local clock signal is adjusted so that it is phase synchronized with the GPS carrier signal, thereby producing a corrected clock signal (block 705) that is phase synchronous with the received GPS signal. Each GCPDO includes a frequency synthesizer that generates a stable timing reference based on the local clock signal and the corrected clock signal that is phase synchronized to the received GPS carrier signal (block 707). The stable timing reference provides a local clock signal that is phase synchronized with the GPS carrier signal. In this way, each receiver/exciter pair receives the same GPS carrier signal and based on the phase of that GPS signal, provides a stable, common timing reference for all receiver/exciter pairs without requiring a complicated distribution system. Each receiver/exciter pair that transmits and/or receives radar signals that are based on the stable timing reference (block 709).

Figure 8:
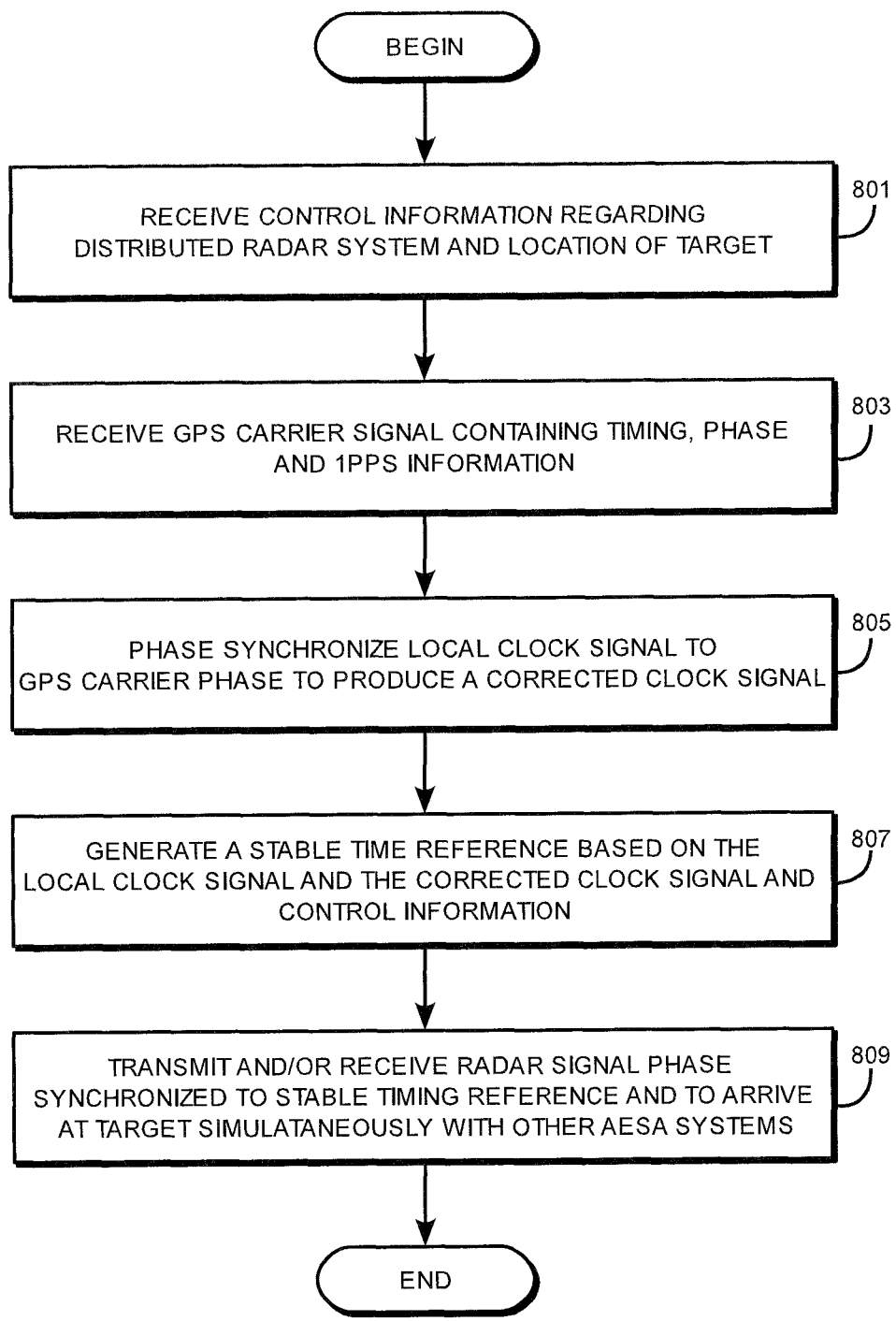
FIG. 8 illustrates a process flow for providing a coherent, synchronized timing reference to a plurality of radar systems in a distributed radar system.

FIG. 8 illustrates a process 800 for providing a coherent synchronized timing reference for a distributed radar system. The distributed radar system comprises a plurality of AESA radar systems, each AESA radar system including a plurality of receiver/exciter elements. Each AESA radar system receives from a central control, control information relating to the distributed radar system and a selected target (block 801). The control information, for example, may including location information for other AESA radar systems in the distributed system that are designated as radar systems that will be transmitting/receiving radar signals in the direction of the proposed target. Additionally, information relating to the location of the proposed target and a begin time for when the distributed system will transmit radar signals at the target may be included in the control information.

At each receiver/exciter element for each AESA radar system a GPS signal is received. The GPS carrier signal may include phase information relating to the carrier signal, as well as timing information and a 1PPS signal transmitted from the GPS satellite (block 803). Each receiver/exciter pair has an associated GCPDO including a local ultra-stable oscillator that provides a local clock signal. By way of non-limiting example, the local oscillator may be a rubidium oscillator, an OCXO oscillator, or a CSAC oscillator. Based on the phase and timing information received in the GPS carrier signal, the local clock signal is adjusted so that it is phase synchronized with the GPS carrier signal, thereby producing a corrected clock signal (block 805) that is phase synchronous with the received GPS signal. Each GCPDO includes a frequency synthesizer that generates a stable timing reference based on the local clock signal and the corrected clock signal that is phase synchronized to the received GPS carrier signal (block 807). The stable timing reference provides a local clock signal that is phase synchronized with the GPS carrier signal and common to all receiver/exciter elements of all AESA radar systems in the distributed radar system. As the goal of the distributed system is to transmit radar signals from each AESA radar system such that the radar signals reach the target simultaneously, the control information received relating to the location of the other AESA radar systems and the location of the target along with the time for beginning radar transmissions is used to delay the phase of the stable timing reference appropriately for each AESA receiver/exciter element to provide a radar signal that is coherently synchronized to all other radar signals transmitted by the system. Thus each AESA radar system transmits and/or receives radar signals synchronized to the received GPS carrier signal and adjusted for the relative positioning of the radar system with respect to the target and other radar systems (block 809).

In yet another exemplary embodiment, a precision electronic warfare system is configured to utilize a GPS carrier phase to enable transmissions from multiple radars to be phase coherent at the target (i.e. enabling wave fronts to coherently combine at a target). Such an embodiment provides advantages such as precision radar jamming. In such a system, a plurality of transmitter/receivers are distributed and are configured to transmit at a common target. For example, a plurality of transmitter/receivers may be mounted to airborne platforms (e.g. weather balloons) positioned about a given region. Each transmitter/receiver is configured to receive information defining what target it will be transmitting at, which other transmitter/receivers will be transmitting at that target, and when the transmission will occur. In this simplified embodiment, each transmitter/receiver operates to (1) phase synchronize its timing reference using a GPS carrier phase to ensure time synchronization with all other transmitter/receivers in the system, (2) determine the time required for a transmission to reach the target, (3) determine the time required for each transmission from other transmitter/receivers to reach the target, and (4) determine a time delay for transmission to enable all transmissions to coherently combine at the target. In this manner, even though the transmitter/receivers are distributed in space, at the target the transmission appears as emanating from a beamformed array.

Embodiments of the present invention refer to time coherency and time synchronization. As is evident to one of ordinary skill in the field of distributed radar systems, all references to coherent timing and synchronized timing refer to timing relative to elements (e.g. radars) within the system rather than actual (absolute) time.

While embodiments of the present invention described herein refer to using GPS signals from GPS satellites to determine both the timing and the location of radar systems, alternative satellites may be used and may provide enhanced accuracy, for example any Global Navigation Satellite Systems (GNSS) may be used. Also, embodiments utilizing GPS may receive GPS signals on various frequencies, such as L1 (1575.42 MHz) or L2 (1227.60 MHz) by way of example only.

Embodiments of the present invention described herein provide coherent timing references between array exciter/receiver elements or between separate radars by each receiving GPS signals from a single (i.e. the same) satellite. In alternative embodiments, each GCPDO or GCPDOM may receive signals from a plurality of GPS satellites and apply an algorithm to determine which satellite to use, thereby enabling each to use the same satellite. In further alternative embodiments, a communication (e.g. received by controller 220 in FIGS. 5 and 6 may tell each GPS receiver which satellite to use based on signal quality data received from each GPS receiver.

Embodiments of the GCPDO and GCPDOM disclosed herein each include a flexible architecture allowing for implementation of various local oscillators as needs change and as higher stability local oscillators become available. By way of non-limiting example, a GPS carrier phase disciplined oscillator is designed to facilitate inclusion of a local oscillator developed under the DARPA Integrated Micro Primary Atomic Clock Technology (IMPACT) program without modification or with minimal redesign. Inclusion of future developed ultra-stable local oscillators may provide many advantages. For example, a system utilizing standard highly stable local oscillators, for example OCXO oscillators, would drift out of synchronization fairly quickly and become unstable if the GCPDO were to lose communication with the GPS satellite. However, implementing a GCPDO with a CASC, for example those being developed under the IMPACT program, may allow a GCPDO to maintain synchronization for up to 24 hours after loss of GPS communication.

The exemplary embodiments discussed herein generally are configured to utilize the GPS carrier phase to maintain coherence between local oscillators. In other embodiments the GPS time code may be first recovered as a course timing reference and the phase can then be used to fine tune the course timing reference.

The exemplary embodiments discussed herein include a GCPDO or GCPDOM and corresponding GPS antenna for each digital receiver/exciter. Such a design provides the advantage that each digital receiver/exciter may operate independently without necessitating distribution of a master timing reference through a complex distribution network. Alternative embodiments may provide for a GCPDO/GCPDOM and corresponding GPS patch antenna for each of several sub-arrays of digital receiver/exciter devices within each AESA radar. Such an alternative exemplary embodiment may allow for reduced weight and complexity of each AESA radar by implementing a simplified distribution network (e.g. a plurality of distribution networks, each configured to distribute a coherent timing reference from a GCPDO to a sub-array of digital receiver/exciter elements) and allow for a reduced number of GPS antennas and GCPDOs/GCPDOMs.

Still other alternative embodiments may include a GCPDO embedded on each digital receiver/exciter but may include a lesser number of GPS antennas. In such an embodiment, each GPS antenna may provide GPS signals to a plurality of GCPDOs.

While the foregoing describes exemplary embodiments and implementations, it will be apparent to those skilled in the art that various modifications and variations can be made to the present invention without departing from the spirit and scope of the invention.

What is claimed is:

1. A method of providing a coherent, synchronized timing reference to a plurality of receiver/exciter pairs of a radar array, comprising:
    receiving, at each receiver/exciter pair, a global positioning system (GPS) carrier signal directly from a GPS satellite, the GPS carrier signal including phase and timing information;
    generating, at each receiver/exciter pair, a local clock signal using a local oscillator;
    phase synchronizing the local clock signal to the received GPS carrier signal to produce a reference clock signal; and
    generating a stable timing reference signal based on the local clock signal and the reference clock signal, the stable timing reference signal being phase synchronized to the received GPS carrier signal.

2. The method of claim 1, wherein the stable timing reference has a frequency greater than the frequency of the reference clock signal.

3. The method of claim 2, wherein the reference clock signal has a frequency of about 10 MHz and a phase accuracy of within about 10 picoseconds of said GPS carrier signal.

4. The method of claim 3, wherein the GPS carrier signal is about 1.5 GHz.

5. The method of claim 4, wherein the stable timing reference has a frequency of about 3 GHz and a phase accuracy of within about 33 femtoseconds of said GPS carrier signal.

6. The method of claim 1, further comprising transmitting or receiving from at least one of the receiver/exciter pairs, radar signals synchronized to the stable timing reference based on the received GPS carrier signal.

7. The method of claim 1, wherein the local oscillator is a rubidium oscillator.

8. The method of claim 1, wherein the local oscillator is an oven controlled crystal oscillator (OCXO).

9. The method of claim 1, wherein the local oscillator is a chip scale atomic clock (CSAC) oscillator.

10. The method of claim 1, further comprising generating a control signal, the control signal indicative of a selected GPS satellite in a GPS satellite constellation, from which the GPS carrier signal is received.

11. A radar system having a plurality of receiver/exciter elements in a radar array for transmitting or receiving phase synchronized radar signals, wherein each receiver/exciter element includes:
    a global positioning system (GPS) carrier phase disciplined oscillator (GCPDO) apparatus comprising:
    a GPS receiver configured to receive a GPS carrier signal directly from a GPS satellite;
    a local oscillator operatively coupled to said GPS receiver; and
    a timing processor responsive to the output of the GPS receiver and to the local oscillator for providing a common clock reference based on the GPS carrier signal, wherein each said common clock reference is coherent with respect to all other receiver/exciter element common clock references; and
    a synthesizer configured to generate radar signals based on the common clock reference, the radar signals being phase synchronized with the received GPS carrier signal.

12. The system of claim 11, wherein said synthesizer is responsive to the coherent common clock reference from said timing processor and to said local oscillator for providing a stable timing reference to a corresponding exciter/receiver element based on the received GPS carrier.

13. The system of claim 11, wherein the timing processor is configured to receive phase and timing data contained in the GPS carrier signal, and to output a control signal to the GPS receiver.

14. The system of claim 13, wherein the control signal includes information about which GPS satellite in a GPS satellite constellation the GPS receiver should receive the GPS carrier signal.

15. The system of claim 11, wherein the local oscillator is in communication with the timing processor and the GPS receiver and configured to provide a local clock signal.

16. The system of claim 11, wherein the timing processor receives the GPS phase and timing data and the local clock signal and outputs a reference clock signal that is phase synchronized to the received GPS signal.

17. The system of claim 11, wherein the reference clock signal has a frequency of 10 MHz and is phase accurate to the GPS carrier signal with 10 picoseconds.

18. The system of claim 11, wherein the local oscillator is a rubidium oscillator.

19. The system of claim 11, wherein the local oscillator is an oven controlled crystal oscillator (OCXO).

20. The system of claim 11, wherein the local oscillator is a chip scale atomic clock (CSAC) oscillator.

21. The system of claim 12, wherein the stable timing reference is at a frequency greater than the frequency of the reference clock signal.

22. The system of claim 11, wherein the GCPDO is configured to generate the reference clock signal based on the received GPS carrier signal periodically at a predetermined time interval.

23. The system of claim 11, wherein the stable timing reference is phase synchronized to a common GPS carrier signal, the GPS carrier signal received by a plurality of other receiver/exciter elements in the radar array.

24. A distributed active electronically scanned array (AESA) radar system comprising a plurality of AESA radar arrays, each AESA radar array remotely positioned relative to the other said AESA radar arrays, each said AESA radar array comprising a plurality of receiver/exciter elements, the distributed AESA radar system comprising:

for each receiver/exciter element:
a global positioning system (GPS) carrier phase disciplined oscillator (GCPDO) configured to receive a GPS carrier signal directly from a GPS satellite and generate a stable timing reference, the stable timing reference phase synchronized to all other receiver/exciter elements and the received GPS carrier signal; and
wherein said receiver/exciter element is configured to transmit or receive radar signals based on the stable timing reference.

25. The distributed AESA radar system of claim 24, further comprising a controller for each AESA radar array, said controller configured to receive control information from a central control.

26. The distributed AESA radar system of claim 24, further comprising for each AESA radar array, a communications module configured to transmit location information relating to the AESA radar array to the central control.

27. The distributed AESA radar system of claim 25, wherein the controller is further configured to receive from the central control, at least one of, information relating to AESA radar systems selected for transmitting radar signals at a target, information relating to the location of an AESA radar system selected for transmitting radar signals at a target, information relating to a location of a target, and information relating to a time when radar signals will be transmitted at a target.

28. The distributed AESA radar system of claim 27, further comprising for each AESA receiver/exciter element, a processor configured to receive the control information from the central control and delay a transmission by the AESA receiver/exciter element such that radar signals transmitted by the AESA receiver/exciter element arrive at a target simultaneously with radar signals transmitted at the target by other AESA radar arrays.

29. A method of synchronizing a plurality of receiver/exciter pairs of a radar array, the method comprising the steps of:

at each receiver/exciter pair of said radar array:
receiving a Global Positioning System (GPS) carrier signal from a GPS satellite;
receiving timing information encoded on said GPS carrier signal and determining phase information relating to the GPS carrier signal;
generating a local clock signal at the receiver/exciter pair;
phase synchronizing the local clock signal with the GPS carrier signal based on the phase information of the GPS carrier signal to produce a reference clock signal, wherein the phase synchronization is performed by each receiver/exciter pair independently of each other receiver/exciter pair;
generating a stable timing reference signal based on the reference clock signal, the stable timing reference signal having a frequency greater than the reference clock signal frequency, and
wherein the stable timing reference signal is coherent with a stable timing reference signal of each other receiver/exciter pair based on the GPS carrier signal received at each receiver/exciter.

* * * * *